US011428552B2

(12) United States Patent
Cheng et al.

(10) Patent No.: US 11,428,552 B2
(45) Date of Patent: Aug. 30, 2022

(54) SENSOR DEVICES ATTACHABLE TO ELECTRONIC DEVICES

(71) Applicant: Hewlett-Packard Development Company, L.P., Spring, TX (US)

(72) Inventors: Ching-Sheng Cheng, Taipei (TW); Chia-Wen Weng, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/418,913

(22) PCT Filed: Apr. 25, 2019

(86) PCT No.: PCT/US2019/029203
§ 371 (c)(1),
(2) Date: Jun. 28, 2021

(87) PCT Pub. No.: WO2020/219055
PCT Pub. Date: Oct. 29, 2020

(65) Prior Publication Data
US 2022/0113170 A1    Apr. 14, 2022

(51) Int. Cl.
*G01D 11/30* (2006.01)
(52) U.S. Cl.
CPC .................................. *G01D 11/30* (2013.01)
(58) Field of Classification Search
CPC ....................................................... G01D 11/30
See application file for complete search history.

(56) References Cited

U.S. PATENT DOCUMENTS

| 1,011,686 | A | 12/1911 | Westaway |
| 5,801,919 | A | 9/1998 | Griencewic |
| 5,808,672 | A | 9/1998 | Wakabayashi et al. |
| 7,844,135 | B2 * | 11/2010 | Steinberg ............. G06V 10/242 |
| | | | 382/296 |
| 8,414,201 | B2 | 4/2013 | Skeoch et al. |
| 9,674,411 | B2 | 6/2017 | Cover |
| 9,729,791 | B2 | 8/2017 | Huerta et al. |
| 10,075,624 | B2 | 9/2018 | Fontana et al. |
| 10,116,866 | B2 | 10/2018 | Karpenko |
| 2016/0006920 | A1 | 1/2016 | Gomes da Motta et al. |
| 2017/0084143 | A1 | 3/2017 | Acera et al. |
| 2017/0152990 | A1 | 6/2017 | Kielland |
| 2020/0312276 | A1 * | 10/2020 | Wu ..................... H04N 21/4367 |

FOREIGN PATENT DOCUMENTS

| WO | WO-2010014074 A1 | 2/2010 |
| WO | WO-2015116127 A1 | 8/2015 |

\* cited by examiner

*Primary Examiner* — Jamel E Williams
(74) *Attorney, Agent, or Firm* — HP, Inc. Patent Department

(57) ABSTRACT

In an example implementation according to aspects of the present disclosure, a system includes a sensor device attachable to an electronic device. The sensor device includes a first alignment member and a first conductive contact. The electronic device includes a second alignment member to align with the first alignment member of the sensor device, and a second conductive contact wherein, upon alignment of the sensor device with the electronic device via the first and second alignment members, to make contact with the first conductive contact of the sensor device.

15 Claims, 5 Drawing Sheets

SENSOR DEVICES ATTACHABLE TO ELECTRONIC DEVICES

BACKGROUND

Video cameras, such as webcams, may be connected to computer hardware, for example, via a cable, or even built into the computer hardware itself. As an example, the video camera may feed or stream its image in real time to or rough a computer to a computer network. When "captured" by the computer, the video stream may be saved, viewed or sent on to other networks travelling through systems such as the internet, and e-mailed as an attachment.

DETAILED DESCRIPTION

Examples disclosed herein provide the ability to move a sensor device, such as the webcam described above, to various locations around an electronic device, based on user preference. For example, as a user may desire to capture images either in front of or behind the electronic device, the user may switch the webcam between a first orientation (e.g., front-facing) and a second orientation (e.g., rear facing). In addition, upon choosing the orientation, rather than having the webcam in a fixed position relative to the electron device for example, horizontally on the top of the electronic device, the we cam may be placed in various locations around the electronic device, as a fixed position may not fit ail user environments. As a result, the webcam may also be placed vertically, on the side of the electronic device, as an example. As will be further described, alignment members may be provided to ensure that the webcam is aligned with the electronic device.

Figure 1A:
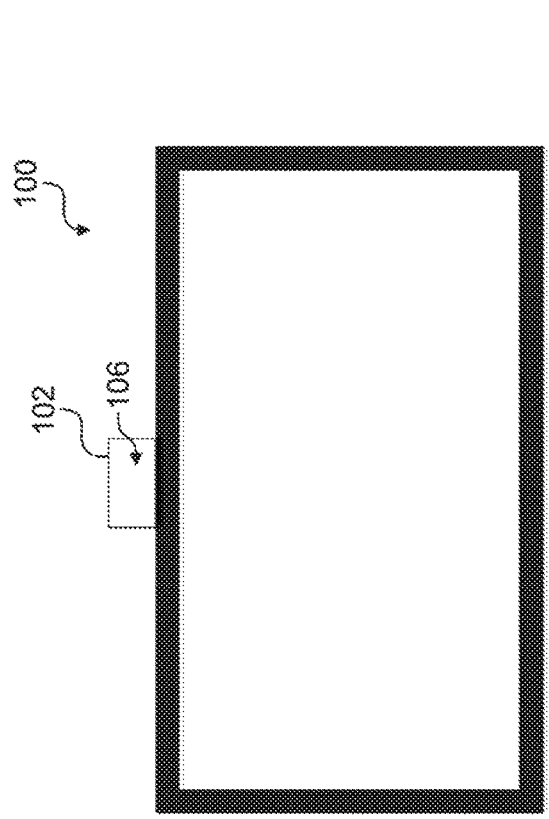
FIGS. 1A-D illustrate an electronic device with a sensor device that is attachable to the electronic device at various locations along a perimeter of the electronic device, according to an example.
Figure 1B:
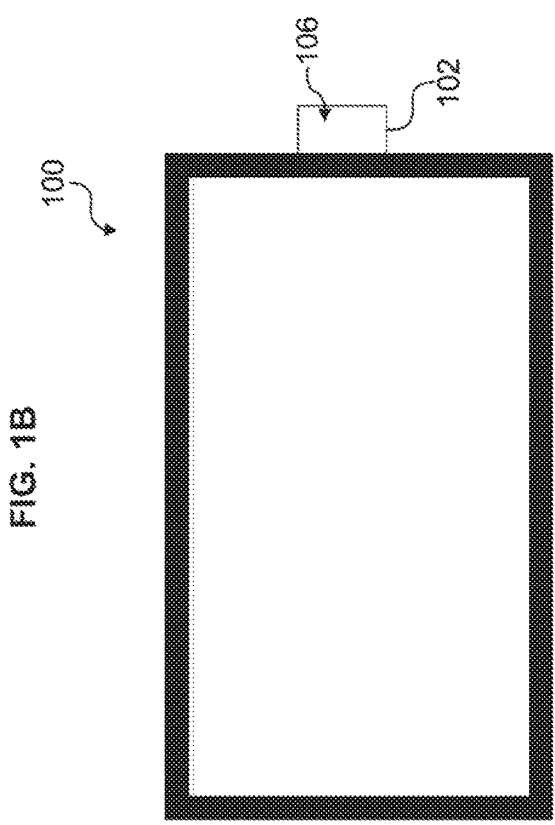

With reference to the figures, FIGS. 1A-D illustrate an electronic device 100, such computer monitor, with a sensor device 102, such as a webcam, that is attachable to the electronic device 100 at various locations along a perimeter of the electronic device 100, according to an example. Referring to FIG. 1A, the sensor device 102 is attached horizontally, on the top of the electronic device 100, with the front 104 of the sensor device 102 facing forward, or towards a user in front of the electronic device 100. As illustrated, a component of the sensor device 102, such as a lens of a webcam, may be located on the front 104 of the sensor device 102. Referring to FIG. 1B, the sensor device 102 is attached horizontally, on the top of the electronic device 100, but facing away from the user (e.g., rear-facing). As a result, a rear 106 of the sensor device 102 faces the user in front of the electronic device 100.

Figure 1C:
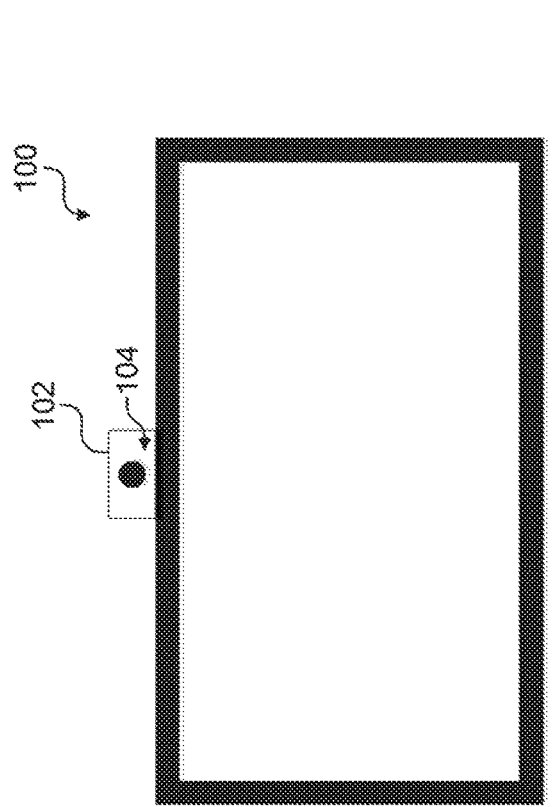
Figure 1D:
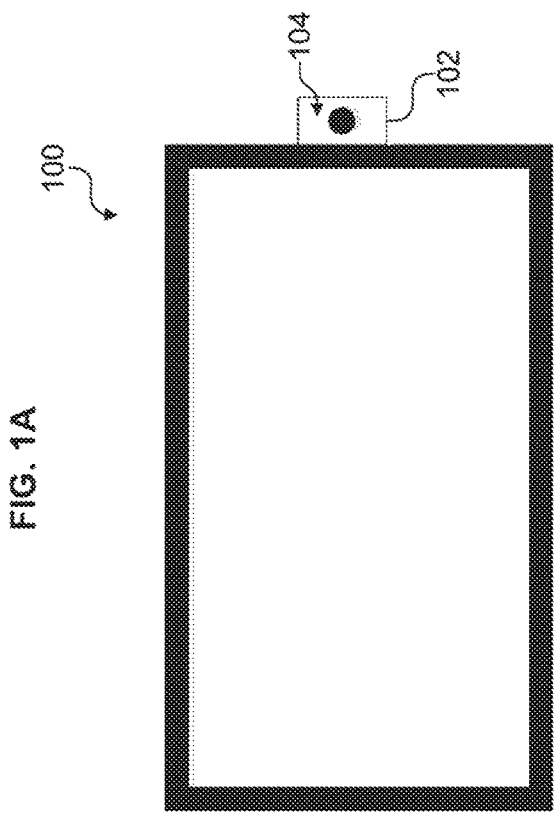

Referring to FIG. 1C, the sensor device 102 is attached vertically, on a side of the electronic device 100, with the front 104 of the sensor device 102 facing forward, towards the user. Referring to FIG. 1D, the sensor device 102 is attached vertically, on the side of the electronic device 100, but facing away from the user. Although the figures illustrate the sensor device 102 in a particular location on the top and side of the electronic device 100, the sensor device 102 may also be attached to the electronic device 100 at other locations along the perimeter of the electronic device 100, as will be further described. For example, alignment members may be included along the perimeter of the electronic device 100, to align with mating alignments members on the sensor device 102. As will be further described, the alignment members on the electronic device 100 and sensor device 102 allow for the sensor device to be placed in various locations along the perimeter of the electronic device 100. Although a computer monitor is given as an example for the electronic device 100, the electronic device 100 may also refer to other devices, such as the display member of a notebook computer. Similarly, in addition to a webcam, the sensor device 102 may refer to other sensors that may benefit from varied placement with respect to the electronic device 100.

Figure 2:
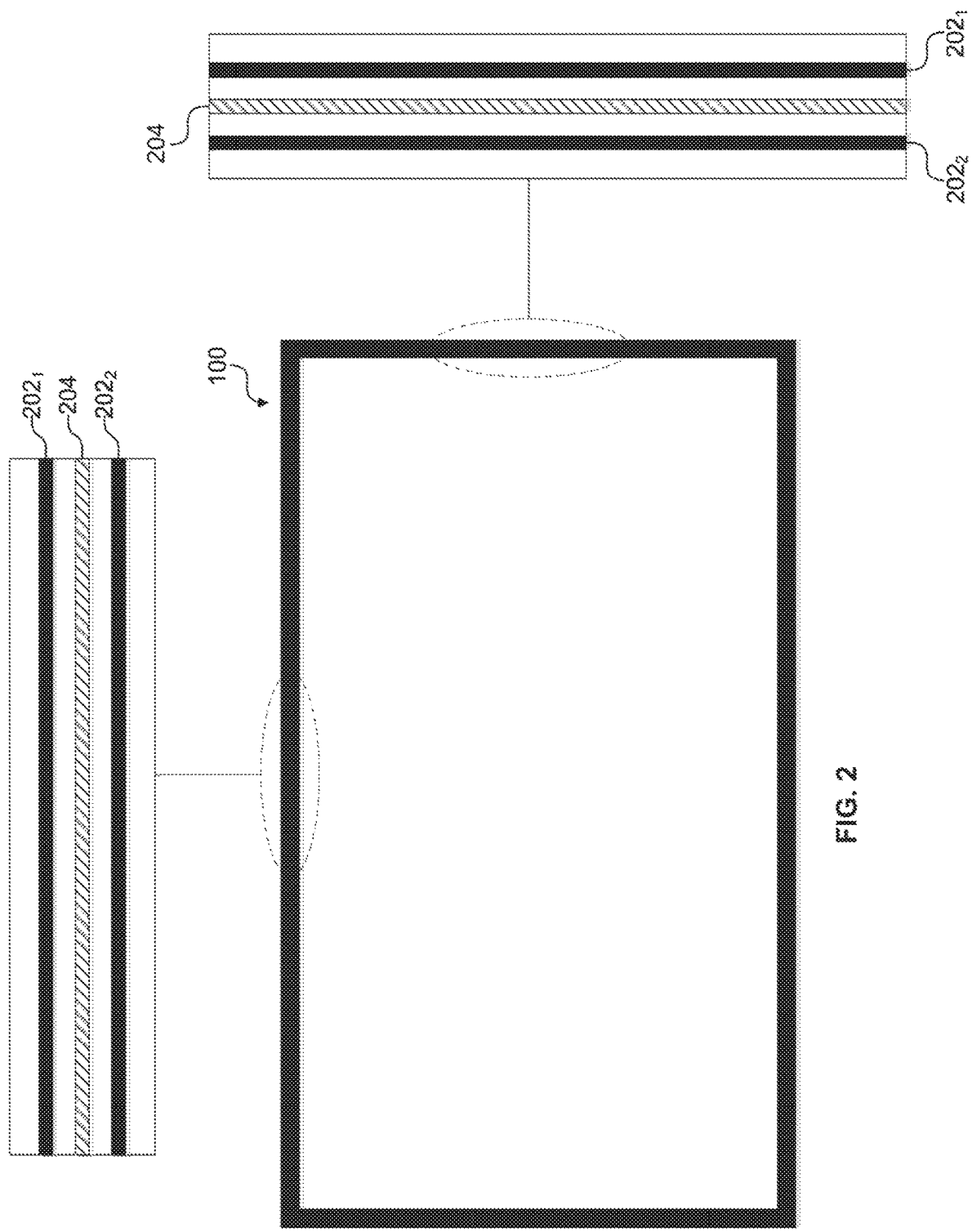
FIG. 2 illustrates features along the perimeter of the electronic device that allow for the attachment of a sensor device, according to an example.

FIG. 2 illustrates features along the perimeter of the electronic device 100 that allow for the attachment of a sensor device (e.g., sensor device 102), according to an example. As an example, alignment members may be provided along the perimeter of the electronic device 100 to align with corresponding alignment members of the sensor device, in addition to a medium that allows for communications to be exchanged between the sensor device and the electronic device 100. As an example, a conductive contact 204 may be provided along the perimeter, wherein upon contact with a conductive contact on the sensor device, communications may be exchanged. However, rather than communication via the conductive contacts on the electronic device 100 and sensor device, they may exchange communications wirelessly, for example, upon alignment.

With regards to the alignment members along the perimeter of the electronic device 100, the electronic device 100 may include magnetic members 202 to magnetically couple with corresponding magnetic members of the sensor device, in order to align the sensor device with the electronic device and establish communication between each other. As an example, a first magnetic member $202_1$ and a second magnetic member $202_2$ is included for ensuring alignment, but the number of magnetic members may vary. As will be further described, the first magnetic member $202_1$ and second magnetic member $202_2$ may be used to determine whether the sensor device is front-facing or rear-facing. Although magnetic members are described, other alignment members may be used to ensure alignment between the sensor device and the electronic device 100. In addition, although alignments members and the conductive contact 204 are described along the whole perimeter of the electronic device 100, allowing for the sensor device to be placed anywhere along the perimeter of the electronic device 100, they may be placed in specific segments around the perimeter of the electronic device 100. For example, each side of the electronic device 100 may include a specific location where the alignments members and the conductive contact 204 may be located, still allowing for the user to move the sensor device around each side of the electron device 100.

Figure 3:
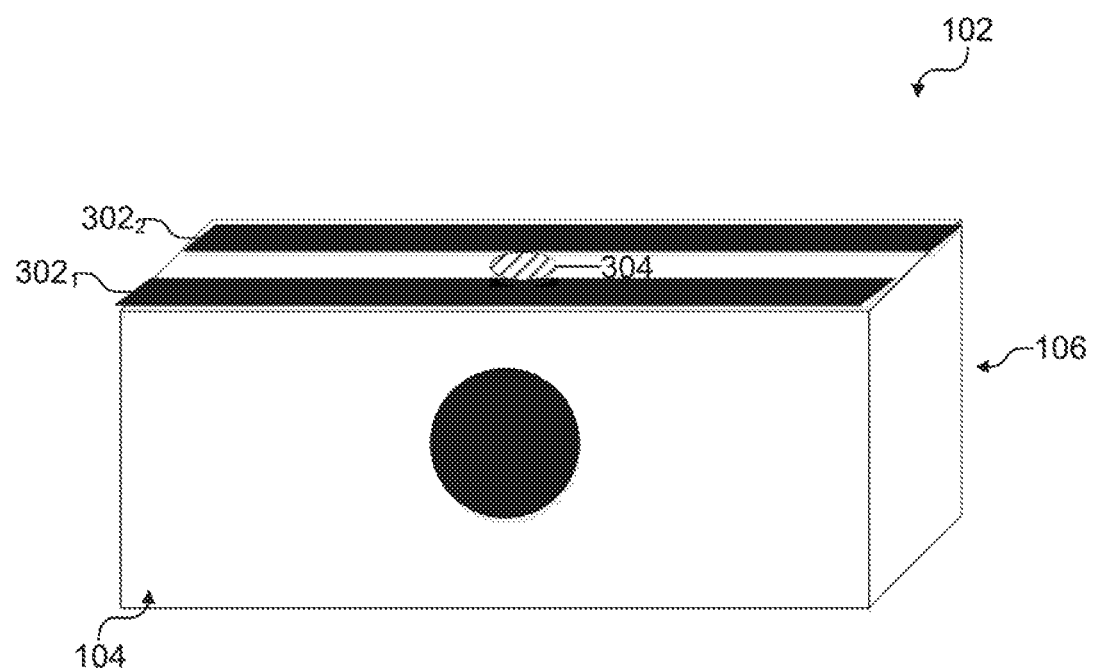
FIG. 3 illustrates features along a bottom surface of the sensor device that allow for attachment to an electronic device, according to an example.

FIG. 3 illustrates features along a bottom surface of the sensor device 102 that allow for attachment to an electronic device (e.g., electronic device 100), according to an example. While describing attachment of the sensor device 102 to the electronic device, reference may be made to the electronic device 100 of FIG. 2, as an example. Alignment members may be provided along the bottom surface of the sensor device 102 to align with corresponding alignment members of the electronic device. As an example, alignment members may include magnetic members 302 that magnetically couple with corresponding magnetic members of the electronic device, in order to align the sensor device 102 with the electronic device. As an example, the magnetic members 302 of the sensor device 102 are to magnetically couple with the magnetic members of the electronic device when the sensor device 102 and the electronic device are to be placed within proximity of each other.

Referring to FIG. 3, a first magnetic member $302_1$ at second magnetic member $302_2$ is included for ensuring alignment, for example, with the first magnetic member $202_1$ and second magnetic member $202_2$ of the electronic device 100. As a result, if the sensor device 102 is attached to the electronic device 100 with the front 104 of the sensor device 102 facing forward, the first magnetic member 302 of the sensor device 102 may magnetically attach to the first magnetic member $202_1$ of the electronic device 100, and the second magnetic member $302_2$ of the sensor device 102 may magnetically attach to the second magnetic member $202_2$ of the electronic device 100. However, if the sensor device 102 is attached to the electronic device 100 rear-facing, with the rear 106 of the sensor device 102 facing forward, the first magnetic member $302_1$ of the sensor device 102 may magnetically attach to the second magnetic member $202_2$ of the electronic device 100, and the second magnetic member $302_2$ of the sensor device 102 may magnetically attach to the first magnetic member 202 of the electronic device 100. As a result, if multiple magnetic members are utilized, the orientation of the sensor device 102 (e.g., whether front-facing or rear-facing) may be determined. Although two magnetic members are illustrated along the bottom surface of the sensor device 102, the number of magnetic members may vary. Its addition, although magnetic members are described, other alignment members may be used to ensure alignment between the sensor device 102 and the electronic device.

Upon alignment of the sensor device 102 with the electronic device, communication may be established between the devices. As an example, the sensor device 102 may include a conductive contact 304 to make contact with conductive contact 204 of the electronic device 100, upon alignment. However, rather than communication via the conductive contacts of the devices, the sensor device 102 and the electronic device may exchange communications wirelessly, for example, upon alignment. As a result, the wireless communication between the sensor device 102 and the electronic device may not be established until there is alignment. This may be particularly useful, for example, for privacy, when the user desires not to use the sensor device 102, and keeps it disconnected from the electronic device. As an example, to further promote privacy, the electronic device may include a compartment for accommodating the sensor device 102 while not in use. As an example, the sensor device 102 may be attachable to additional electronic devices, besides a single electronic device, to exchange communications with an electronic device from the additional electronic devices that the sensor device 102 is attached to.

Figure 4:
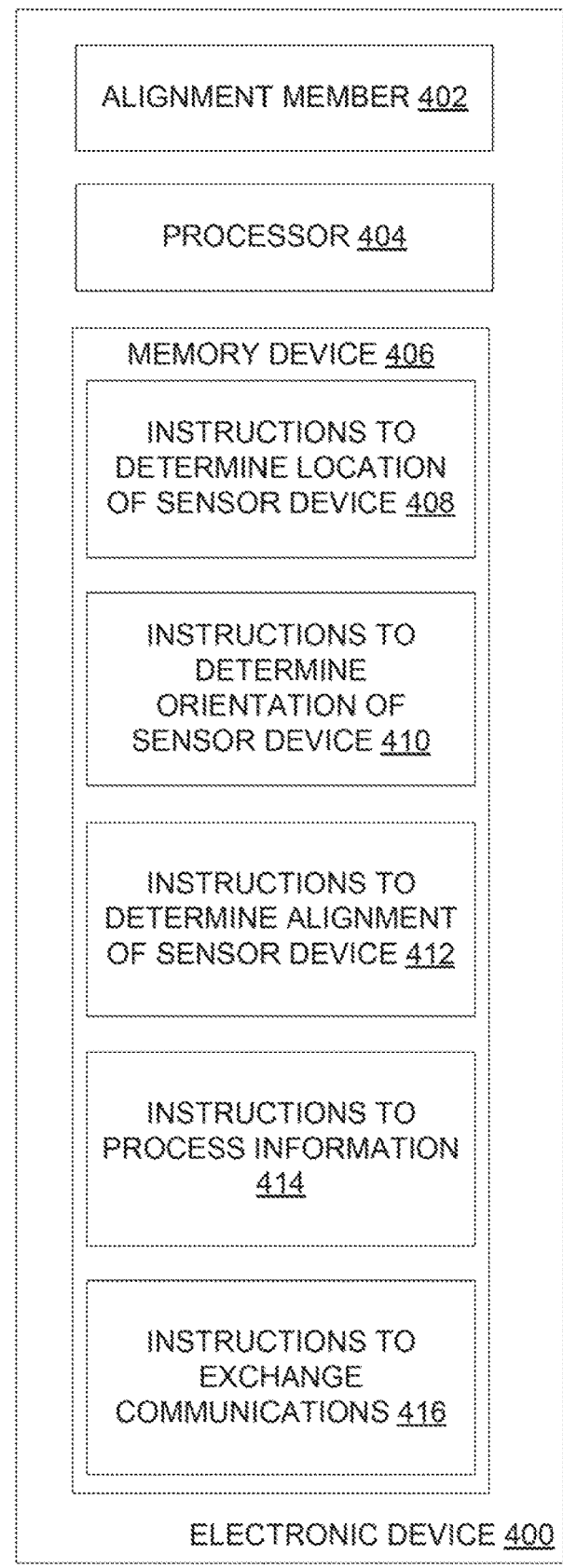
FIG. 4 illustrates an electronic device that detects for the attachment of a sensor device, for enabling communications between the sensor device and the electronic device, according to an example.

FIG. 4 illustrates an electronic device 408 that detects for the attachment of a sensor device, for enabling communications between the sensor device and the electronic device 400, according to an example. The electronic device 400 and the sensor device may correspond to the electronic device 100 and sensor device 102 illustrated in FIGS. 1-3, and reference may be made to them. The electronic device 400 depicts a processor 404 and a memory device 404 and, as an example of the electronic device 400 performing its operations, the memory device 406 may include instructions 408-416 that are executable by the processor 404. Thus, memory device 406 can be said to store program instructions that, when executed by processor 404, implement the components of the electronic device 400. The executable program instructions stored in the memory device 406 include as an example, instructions to determine location of sensor device (408), instructions to determine orientation of sensor device (410), instructions to determine alignment of sensor device (412), instructions to process information (414), and instructions to exchange communications (416).

Instructions to determine location of sensor device (408) represent program instructions that when executed by the processor 404 cause the electronic device 400 to determine which location along a perimeter of the electronic device 400 the sensor device is attached to the electronic device 400. Referring to electronic device 100, alignment members (e.g., magnetic members 202) may be provided along a perimeter of the electronic device 100, to align with corresponding alignment members of the sensor device. In addition, a medium may be provided that allows for communications to be exchanged between the sensor device and the electronic device 100. For example, a conductive contact 204 may be provided along the perimeter, wherein upon contact with a conductive contact on the sensor device, communications may be exchanged. However, rather than communication via the conductive contacts on the electronic device 100 and sensor device, they may exchange communications wirelessly, for example, upon alignment.

Similarly, sensor device 102 may include corresponding alignment members (e.g., magnetic members 302) and a conductive contact 304 to mate with the alignment members and conductive contact of the electronic device 100. As an example, the mating of the alignment members of the electronic device 400 and sensor device, and the conductive contacts of the electronic device 400 and sensor device, alone or in combination, may be used to determine the location along the perimeter of the electronic device 400 that the sensor device is attached to the electronic device 400. For example, if the sensor device is attached horizontally on the top of the electronic device 400 (e.g., see FIG. 1A), the alignment members and/or the conductive contact at that portion along the perimeter of the electronic device 400 may determine the location of the sensor device as such. Similarly, if sensor device is attached vertically on the side of the electronic device 400 (e.g., FIG. 1C), the alignment members and/or the conductive contact at that portion along the perimeter of the electronic device 400 may determine the location of the sensor device as such.

Instructions to determine orientation of sensor device (410) represent program instructions that when executed by the processor 404 cause the electronic device 400 to determine whether the sensor device is attached to the electronic device 400 in either a first orientation or a second orientation. As an example, if multiple magnetic members are utilized, the orientation of the sensor device (e.g., whether front-facing or rear-facing) may be determined, as described above. For example, referring to FIGS. 2-3, if the sensor device 102 is attached to the electronic device 100 with the front 104 of the sensor device 102 facing forward, the first magnetic member $302_1$ of the sensor device 102 may magnetically attach to the first magnetic member 202 of the electronic device 100, and the second magnetic member $302_2$ of the sensor device 102 may magnetically attach to the second magnetic member $202_2$ of the electronic device 100. However, if the sensor device 102 is attached to the electronic device 100 rear-facing, with the rear 106 of the sensor device 102 facing forward, the first magnetic member 302 of the sensor device 102 may magnetically attach to the second magnetic member $202_2$ of the electronic device 100, and the second magnetic member $302_2$ of the sensor device 102 may magnetically attach to the first magnetic member $202_1$ of the electronic device 100. As an example, the arrangement of how the alignment members of the electronic device 400 and the sensor device mate with each other may determine whether the sensor device is attached to the electronic device 400 in either a first orientation or a second orientation.

Instructions to determine alignment of sensor device (412) represent program instructions that when executed by the processor 404 cause the electronic device 400 to determine whether the sensor device is aligned with the electronic device 400. As described above, this may be particularly useful for privacy, where wireless communication between the sensor device and the electronic device 400 may not be established until there is alignment. As an example, for magnetic members, a user would have to bring the sensor device within proximity of the magnetic members of the electronic device 400 in order to initiate alignment. Once such magnetic coupling occurs, a signal may be sent to the electronic device 400 to indicate alignment.

Instructions to process information (414) represent program instructions that when executed by the processor 404 cause the electronic device 400 to process information from the sensor device according to the location and the orientation of the sensor device with respect to the electronic device 400. For example, if a webcam is attached vertically along a side of the electronic device 400 (e.g., see FIG. 1C), the electronic device 400 may process the information from the webcam in a portrait orientation. Similarly, if the webcam is attached horizontally along the of the electronic device 400 (e.g., see FIG. 1A), the electronic device 400 may process the information from the webcam in a landscape orientation. Similarly, if the webcam is attached to the side of the electronic device 400 in a first orientation (e.g., front-facing as illustrated in FIG. 1C), the electronic device 400 may, process the information received from the webcam differently, compared to if the webcam is attached to the side of the electronic device 400 in a second orientation (e.g., rear-facing as illustrated in FIG. 1D).

Instructions to exchange communications (416) represent program instructions that when executed by the processor 404 cause the electronic device 400, upon alignment of the sensor device with the electronic device 400, to exchange communications with the sensor device. As previously mentioned, this may be particularly useful for privacy, where wireless communication between the sensor device and the electronic device 400 may not be established until there is alignment.

Memory device 406 represents generally any number of memory components capable of storing instructions that can be executed by processor 404. Memory device 406 is non-transitory in the sense that it does not encompass a transitory signal but instead is made up of at least one memory component configured to store the relevant instructions. As a result, the memory device 406 may be a non-transitory computer-readable storage medium. Memory device 408 may be implemented in a single device or distributed across devices. Likewise, processor 404 represents any number of processors capable of executing instructions stored by memory device 406. Processor 404 may be integrated in a single device or distributed across devices. Further, memory device 406 may be fully or partially integrated in the same device as processor 404, or it may be separate but accessible to that device and processor 404.

In one example, the program instructions 408-416 can be part of an installation package that when installed can be executed by processor 404 to implement the components of the electronic device 400. In this case, memory device 406 may be a portable medium such as a compact disc (CD), digital versatile disc (DVD), or flash drive or a memory maintained by a server from which the installation package can be downloaded and installed. In another example, the program instructions may be part of an application or applications already installed. Here, memory device 406 can include integrated memory such as a hard drive, solid state drive, or the like.

Figure 5:
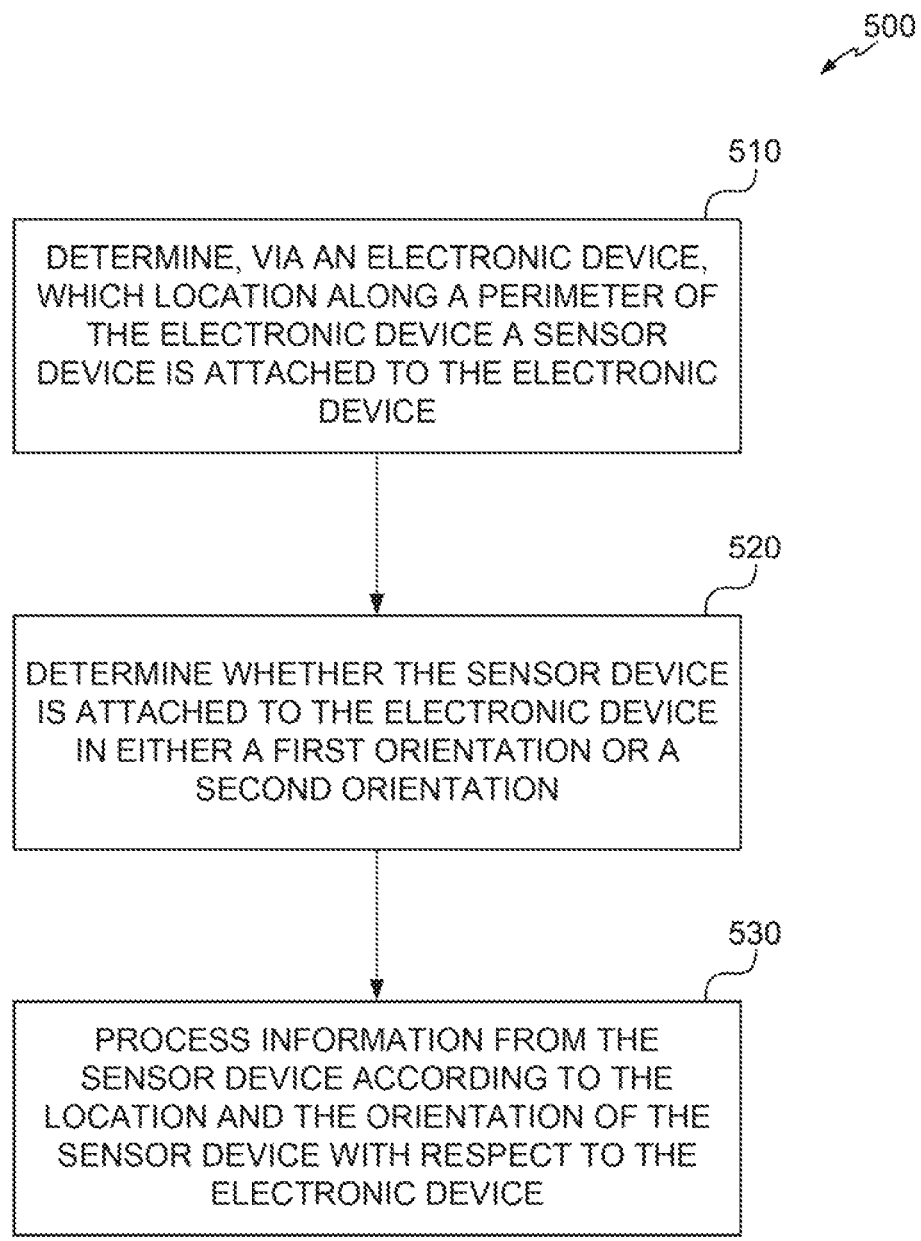
FIG. 5 is a flow diagram in accordance with an example of the present disclosure.

FIG. 5 is a flow diagram 500 taken by an electronic device to implement a method for enabling communications between a sensor device attachable to the electronic device, according to an example. Although the flow diagram of FIG. 5 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present disclosure.

At 510, the electronic device determines which location along a perimeter of the electronic device the sensor device is attached to the electronic device. As described above, alignment members may be provided along a perimeter of the electronic device, to align with corresponding alignment members of the sensor device. In addition, a medium may be provided that allows for communications to be exchanged between the sensor device and the electronic device. For example, a conductive contact may be provided along the perimeter, wherein upon contact with a conductive contact on the sensor device, communications may be exchanged. As an example, the mating of the alignment members of the electronic device and sensor device, and the conductive contacts of the electronic device and sensor device, alone or in combination, may be used to determine the location along the perimeter of the electronic device that the sensor device is attached to the electronic device.

At 520, the electronic device determines whether the sensor device is attached to the electronic device in either a first orientation or a second orientation. As described above, the arrangement of how the alignment members of the electronic device and the sensor device mate with each other may determine whether the sensor device is attached to the electronic device in either the first orientation or the second orientation. At 530, the electronic device processes information from the sensor device according to the location and the orientation of the sensor device with respect to the electronic device.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the scope of the disclosure. Thus, the present disclosure is not intended to be limited to the examples shown herein but is to be accorded the widest scope consistent with the principles and novel features disclosed herein.

What is claimed is:

1. A system comprising:
    a sensor device attachable to an electronic device via either a first orientation or a second orientation, the sensor device comprising:
        a first alignment member; and
        a first conductive contact; and
    the electronic device comprising:
        a second alignment member to align with the first alignment member of the sensor device in either the first orientation or the second orientation;
        a second conductive contact wherein, upon alignment of the sensor device with the electronic device via the first and second alignment members, to make contact with the first conductive contact of the sensor device; and
    a processor to:
        exchange communications between the sensor device and the electronic device, via the first and second conductive contacts, upon the alignment of the sensor device with the electronic device.

2. The system of claim 1, wherein the sensor device is attachable to additional electronic devices and is to exchange communications with an electronic device from the additional electronic devices that the sensor device is attached to.

3. The system of claim 1, wherein the electronic device comprises a compartment for accommodating the sensor device while not in use.

4. They system of claim 1, wherein the first alignment member and the second alignment member comprise first magnetic member and a second magnetic member, respectively, wherein when the sensor device is to align with the electronic device, the first magnetic member of the sensor device is to magnetically couple with the second magnetic member of the electronic device.

5. The system of claim 4, wherein the first magnetic member of the sensor device is to magnetically couple with the second magnetic member of the electronic device when the sensor device and the electronic device are to be placed within proximity of each other.

6. The system of claim 1, wherein the second alignment member and the second conductive contact are disposed along a perimeter of the electronic device.

7. The system of claim 6, wherein the sensor device is attachable to the electronic device at various locations along the perimeter of the electronic device.

8. The system of claim 7, wherein the processor is to:
    determine which location along the perimeter of the electronic device the sensor device is attached to the electronic device;
    determine whether the sensor device is attached to the electronic device in either the first orientation or the second orientation; and
    process information from the sensor device according to the location and the orientation or the sensor device with respect to the electronic device.

9. A method comprising:
    determining, via an electronic device, which location along a perimeter of the electronic device a sensor device attached to the electronic device;
    determining whether the sensor device is attached to the electronic device in either a first orientation or a second orientation; and
    processing information from the sensor device according to the location and the orientation of the sensor device with respect to the electronic device.

10. The method of claim 9, comprising:
    determining w ether the sensor device is aligned with the electronic device.

11. The method of claim 10, comprising:
    wherein, upon alignment of the sensor device with the electronic device, exchanging communications with the sensor device.

12. The method of claim 10, wherein determining whether the sensor device is aligned with the electronic device comprises determining whether an alignment member of the sensor device makes contact with an alignment member of the electronic device.

13. A non-transitory computer-readable storage medium comprising program instructions which, when executed by a processor of an electronic device, cause the processor to:
    determine which location along, a perimeter of the electronic device a sensor device is attached to the electronic device;
    determine whether the sensor device is attached to the electronic device in either a first orientation or a second orientation;
    determine whether the sensor device is aligned with the electronic device;
    process information from the sensor device according to the location and the orientation of the sensor device with respect to the electronic device; and
    upon alignment of the sensor device with the electronic device, exchange communications with the sensor device.

14. The non-transitory computer-readable storage medium of claim 13, wherein the program instructions, when executed, causing the processor to determine whether the sensor device is aligned with the electronic device comprises determining whether an alignment member of the sensor device makes contact with an alignment member of the electronic device.

15. The non-transitory computer-readable storage medium of claim 14, wherein the alignment member of the sensor comprises a magnetic member and the alignment member of the electronic device comprises a second magnetic member, wherein the program instructions, when executed, causing the processor to determine whether an alignment member of the sensor device makes contact with an alignment member of the electronic device comprises determining whether the first magnetic magnetically couples with the second magnetic member.

\* \* \* \* \*